United States Patent

Demarest et al.

[11] Patent Number: 5,960,585
[45] Date of Patent: *Oct. 5, 1999

[54] BAIT STATION FOR CRAWLING INSECTS

[75] Inventors: Scott W. Demarest, Caledonia; Charles Austen Angell, Madison; Paul E. Furner, Caledonia, all of Wis.

[73] Assignee: S. C. Johnson & Son, Inc., Racine, Wis.

[*] Notice: This patent is subject to a terminal disclaimer.

[21] Appl. No.: 08/787,558

[22] Filed: Jan. 22, 1997

Related U.S. Application Data

[63] Continuation-in-part of application No. 08/715,558, Sep. 18, 1996, Pat. No. 5,802,761.

[51] Int. Cl.$^6$ .................................................. A01M 1/20
[52] U.S. Cl. .................................................................. 43/131
[58] Field of Search .......................... 43/131, 121, 132.1

[56] References Cited

U.S. PATENT DOCUMENTS

| | | |
|---|---|---|
| D. 258,751 | 3/1981 | Lindley . |
| D. 306,895 | 3/1990 | Mares . |
| D. 326,890 | 6/1992 | Mares . |
| D. 328,486 | 8/1992 | Sase . |
| D. 335,521 | 5/1993 | Peterson . |
| 4,251,946 | 2/1981 | Lindley ........................................ 43/131 |
| 4,349,982 | 9/1982 | Sherman ...................................... 43/131 |
| 4,485,582 | 12/1984 | Morris . |
| 4,541,198 | 9/1985 | Sherman ...................................... 43/131 |
| 4,563,836 | 1/1986 | Woodruff et al. . |
| 4,658,536 | 4/1987 | Baker ......................................... 43/131 |
| 4,747,230 | 5/1988 | Zalesky ...................................... 43/131 |
| 4,761,912 | 8/1988 | Dyer et al. . |
| 4,782,621 | 11/1988 | Wissman . |
| 4,823,506 | 4/1989 | Demarest et al. . |
| 4,837,969 | 6/1989 | Demarest . |
| 4,894,947 | 1/1990 | Brandli . |
| 5,033,229 | 7/1991 | Demarest et al. . |
| 5,040,327 | 8/1991 | Stack .......................................... 43/131 |
| 5,048,225 | 9/1991 | Brandli . |
| 5,357,709 | 10/1994 | Lin ............................................ 43/131 |
| 5,448,852 | 9/1995 | Spragins ..................................... 43/131 |

FOREIGN PATENT DOCUMENTS

2 071 980  9/1981  United Kingdom .

Primary Examiner—Kurt Rowan

[57] ABSTRACT

A bait station for crawling insects and method for presenting bait to targeted insects. The bait station includes a base and a cover fastened to the base. The base includes a bait cup with a bait cup wall. A side support extends upwardly above the level of the bait cup wall. The cover includes a shell that defines a walkway between the shell wall and the bait cup wall. The shell also includes a roof that spans the space encompassed by the shell wall, the roof being supportable by the side support. An antechamber is defined on one side by the side support and on another side by the shell wall. The floor of the antechamber is continuous with the floor of the walkway. An antechamber door in the shell wall opens into the antechamber to admit targeted insects thereto and is so located that straight line access through the antechamber door to the bait cup is restricted by the side support. The antechamber is sufficiently wide from the side support to the shell wall as to provide room for a targeted insect to enter the bait station through the antechamber door and avoid the side support by entering the walkway, thus gaining access to any bait contained in the bait cup. The method of the invention includes providing such a bait station, containing a selected bait within the bait cup and placing the bait station on a surface where targeted insects crawl.

20 Claims, 5 Drawing Sheets

BAIT STATION FOR CRAWLING INSECTS

This is a continuation-in-part of U.S. patent application Ser. No. 08/715,558, filed Sep. 18, 1996, now U.S. Pat. No. 5,802,761.

TECHNICAL FIELD

The present invention relates generally to the field of insect bait stations. More particularly, the invention relates to insect bait stations adapted for use with crawling insects.

BACKGROUND ART

The art is generally aware of insect bait stations for crawling insects that have a base with various topographical features and with a cover that spans those features to create an enclosed bait station. Examples include Woodruff et al., U.S. Pat. No. 4,536,836; Brandli, U.S. Pat. No. 4,894,947; Brandli, U.S. Pat. No. 5,048,225; Morris, U.S. Pat. No. 4,485,582; Mares, U.S. Pat. No. Des. 306,895; Mares, U.S. Pat. No. Des. 326,890; Wissman, U.S. Pat. No. 4,782,612; Gentile, U.S. Pat. No. 4,793,093; Demarest et al., U.S. Pat. No. 4,823,506; Demarest, U.S. Pat. No. 4,837,969; and Lin, U.S. Pat. No. 5,357,709. This list is by no means intended to be comprehensive, this being a crowded art.

Commonly, though not universally, these bait stations employ features such as walls or passageways that are unitarily formed as parts of the base of the bait station. The cover associated with such a base typically spans these structures without significantly obstructing them.

Woodruff et al., U.S. Pat. No. 4,563,836, is an example of this sort of structure, the base portion of the Woodruff et al. insect feeding station including outer and inner walls with openings in them through which insects can pass. In Woodruff, all of these features are formed as a unitary piece of a flat, deformable sheet of plastic or other material. The Woodruff et al. cover spans all of these features. All portions of the cover remain elevated well above the floors of the openings that are formed in the walls, leaving these openings sufficiently unobstructed that an insect can pass through them. Except for its relatively shallow rim, the Woodruff et al. cover itself is a generally flat, featureless structure, an arrangement not uncommon among the bait stations noted above.

The bait station of Demarest, U.S. Pat. No. 4,837,969, utilizes a different approach. In Demarest, '969, the base includes a number of upwardly projecting features. The cover, however, instead of simply being flat, includes as parts of the cover the exterior side walls of the bait station. The cover of Demarest '969 thus constitutes a shell that fits down over and interacts with the underlying structures of the base. The doors by which insects can enter the Demarest '969 bait station are formed not as gaps in or between walls rising from the base but instead are holes in the shell portion of the cover.

The cover of a bait station such as that of Demarest '969 must be capable of bearing a certain amount of top loading without being crushed. Thin walls for the shell are desirable in order to reduce the amount of plastic used in manufacture, thus contributing to the economy of the bait station. But thinning the walls reduces their strength and crush resistance.

In Demarest '969, inner walls, shown at 14 in FIG. 2 of Demarest '969, are formed as a part of the base and provide support for the cover. The geometry of the Demarest '969 bait station is such that these walls may be longitudinally extended, projecting radially from a central well 18 (seen in FIG. 2 of Demarest '969) toward the outermost portions of the cover. This arrangement is accommodated by the "multi-lobed" design of the cover, as disclosed in Demarest '969. Thus the cover of Demarest '969 may be thin and relatively flexible in that it need span only the modest width of the bait well of the bait station. However, the arrangement does subdivide each lobe of the cover, thus blocking the movement of insects around the periphery of the interior of the bait station.

An ongoing need still exists in the art for a bait station for crawling insects that utilizes a cover that has a shell that may be made of thin materials but that is used in association with a base having structures that provide longitudinally extended support for the shell such that the shell can span relatively great distances with adequate crush resistance, such bait station still providing ready access to bait held within the bait station for insects entering doors formed in the shell.

SUMMARY OF THE INVENTION

The bait station of the invention for targeted crawling insects may be summarized in that the bait station includes a base and a cover that is fastened to the base. The base includes a bait cup for containing a selected bait, the bait cup having a central floor surrounded by an insect-climbable bait cup wall extending upwardly from the central floor. The base also includes a peripheral flange including a peripheral floor distal and adjacent to the bait cup and an end support extending upwardly from the peripheral floor, the end support having a roof detent.

The cover has a cover flange attached to the peripheral flange of the base and further includes a shell. The shell includes a shell wall rising from the level of and enclosing the peripheral floor of the base, the shell wall preferably being spaced from the bait cup wall to define a walkway therebetween having a walkway floor of a width sufficient to allow targeted insects to walk thereon. A roof spans the space encompassed by the shell wall, the roof being supportable by the end support and being sufficiently spaced above the bait cup wall that targeted insects may crawl over the bait cup wall to reach any bait contained within the bait cup. The roof further includes a locator rib engaged in the roof detent of the end support to stabilize movement of the roof with respect to the end support.

Alternatively, the invention may be summarized in that a bait station for targeted crawling insects includes a base and a cover that is fastened to the base, the base including a bait cup for containing a selected bait. The bait cup has a central floor surrounded by an insect-climbable bait cup wall extending upwardly from the central floor. The base further includes a peripheral flange including a peripheral floor distal and adjacent to the bait cup and a side support extending upwardly above the level of the bait cup wall and extending longitudinally generally along the bait cup wall.

The cover has a cover flange attached to the peripheral flange of the base and further includes a shell. The shell includes a shell wall rising from the level of and enclosing the peripheral floor of the base and a roof spanning the space encompassed by the shell wall. The roof is supportable by the side support and is sufficiently spaced above the bait cup wall that targeted insects may crawl over the bait cup wall to reach any bait contained within the bait cup.

An antechamber is defined on one side by the side support and on another side by interior surfaces of the shell wall. An antechamber door in the shell wall opens into the antechamber and has a size sufficiently large to admit a targeted insect.

The antechamber door is so located in relation to the side support that straight-line access through the antechamber door to the bait cup is restricted by the side support. The antechamber provides sufficient space from the side support to the shell wall that a targeted insect may enter the bait station through the antechamber door, avoid the side support, and thus gain access to any bait contained in the bait cup.

As an additional alternative, the invention may be summarized in that a bait station for targeted crawling insects includes a base and a cover that is fastened to the base, the base including a bait cup for containing a selected bait, the bait cup having a central floor surrounded by an insect-climbable bait cup wall extending upwardly from the central floor, and a peripheral flange including a peripheral floor distal and adjacent to the bait cup.

The cover has a cover flange attached to the peripheral flange of the base and further includes a shell that includes a shell wall rising from the level of the peripheral floor of the base, and a roof spanning the space encompassed by the shell wall, at a distance above the bait cup wall sufficient that targeted insects may crawl over the bait cup wall to gain access to any bait contained therein. One of the cover and the base includes a side support substantially spanning the space between the cover and the base, the roof being supportable by the side support.

A part of the shell wall at the location of the side support constitutes an antechamber shell wall. A portion of the antechamber shell wall is displaced distally relative to the portions of the shell wall immediately on either side of the antechamber shell wall so that the antechamber shell wall defines a thrust-out wall section. The space between the antechamber shell wall and the portion of the bait cup wall opposed thereto defines an antechamber.

The method of the invention may be summarized in that a method of presenting bait to targeted crawling insects includes a first step of providing a bait station in accordance with one of the bait stations summarized above, further including a selected bait placed within the bait cup. A second step of the method of the invention is to place the bait station on a surface upon which the targeted insects crawl.

DETAILED DESCRIPTION OF THE PREFERRED EMBODIMENT

Figure 1:
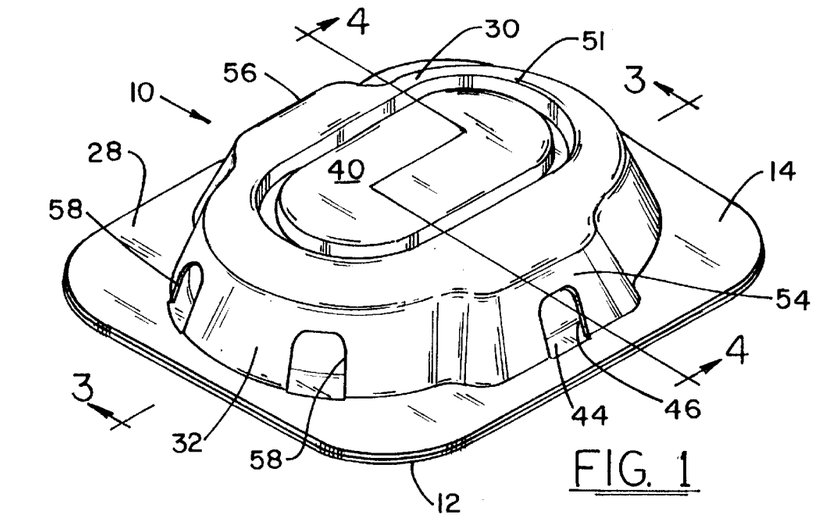
FIG. 1 is a front perspective view of the preferred embodiment of the insect bait station of the invention.

Turning now to the drawings, wherein like parts are indicated by like reference numbers, a first embodiment of the insect bait station of the invention is shown generally in FIG. 1 at 10. The insect bait station 10 is intended for use with crawling insects such as, but not limited to, roaches and ants. When the size of parts described below is stated in terms of a targeted insect, it is presumed that the type and therefore the size of the targeted insect is known.

The bait station 10 has a base 12 and cover 14, the cover being fastened to the base. The base 12 and cover 14 each are unitarily formed, preferably from plastic by thermoforming, injection molding, or any other of the means familiar to those skilled in the art for making thin-walled plastic parts.

Figure 2:
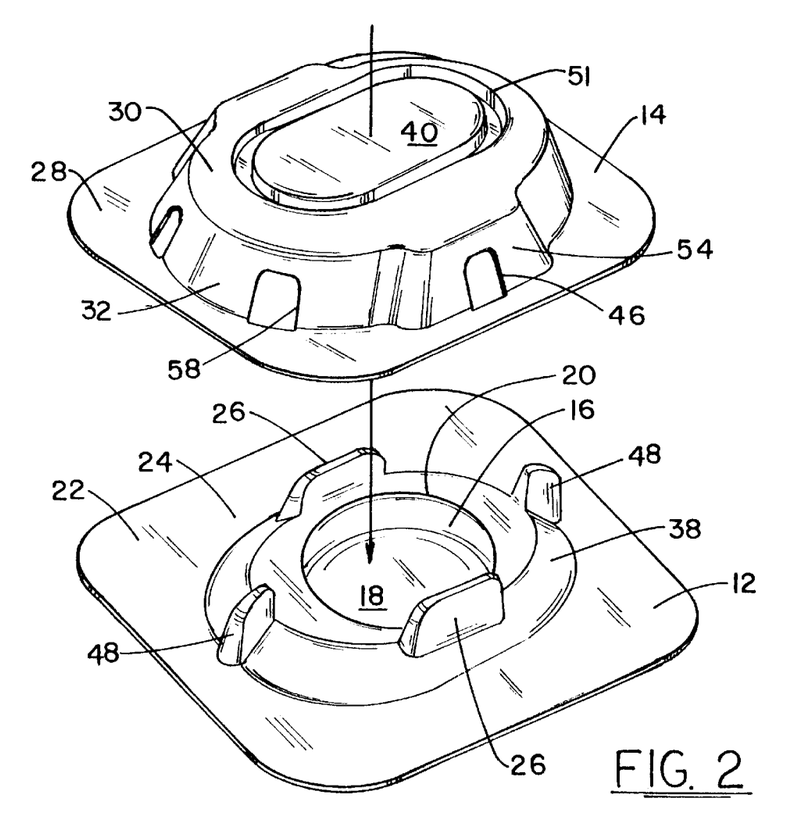
FIG. 2 is an exploded view of the insect bait station of FIG. 1, showing the base and the cover.
Figure 3:
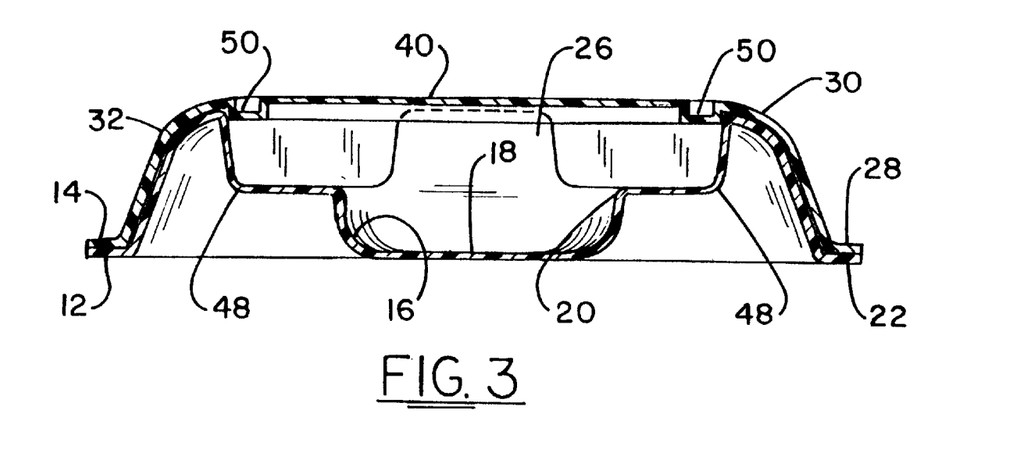
FIG. 3 is a cross-sectional view of the insect bait station of FIG. 1, taken along section lines 3—3 of FIG. 1.

The base 12 includes a bait cup 16, most easily seen in FIG. 2. The bait cup 16 is provided as a container for a selected bait (not shown). A variety of baits suitable for use within the bait station 10 are well known to those skilled in the art and commonly include an insecticide or other material to which it is desired to expose a targeted insect.

The bait cup 16 has a central floor 18. The central floor 18 is surrounded by an insect-climbable bait cup wall 20. The bait cup wall 20 extends upwardly from the central floor 18 for a selected distance.

The base 12 further includes a peripheral flange 22. A portion of the peripheral flange 22 that is distal and adjacent to the bait cup 16 is designated as the peripheral floor 24. The width of the peripheral floor 24 outwardly from the bait cup 16 is defined below.

At least one side support 26 extends upwardly from the base to a point above the upwardmost extension of the bait cup wall 20. The side support 26 is longitudinally extended and preferably extends longitudinally generally along the bait cup wall 20, the arrangement shown in the embodiments of FIGS. 2–6.

The bait cup wall 20 may define any convenient, closed geometric shape, including but not limited to a circle (as shown in the drawings), an oval, or other regular or irregular curved shape; a square, rectangle, triangle, or other straight-sided shape; or a shape having a combination of straight and curved sides. A side support 26 shall be deemed to extend longitudinally "generally along" the bait cup wall 20 if the side support extends longitudinally in a direction that includes or varies between being equidistant from the bait cup wall, curving toward the bait cup wall, and being parallel to a tangent to the bait cup wall, such tangent being taken at a point within the length of and preferably at the middle of the side support. This orientation of the side support 26 will be referred to herein as the "preferred orientation" of the side support. Alternative orientations of the side support 26 are discussed, below.

The cover 14 has a cover flange 28. The cover flange 28 is fixedly attached to the peripheral flange 22 of the base 12. Such attachment may be by the use of a glue, thermoplastic welding, riveting, stapling, or other mechanical means, or any other convenient means of attachment selected from among the many examples well known to those skilled in the art.

The cover 14 includes a shell 30. The shell 30 includes a shell wall 32. The shell wall 32 rises from the level of and encloses the peripheral floor 24 of the base 12. The peripheral floor 24 thus extends between the bait cup wall 20 and the shell wall 32.

Figure 4:
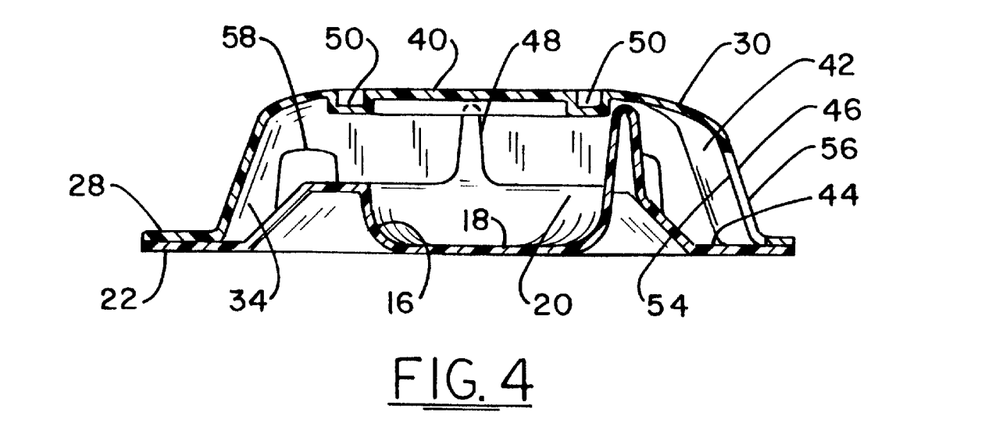
FIG. 4 is a cross-sectional view of the insect bait station of FIG. 1, taken along staggered section lines 4—4 of FIG. 1.
Figure 5:
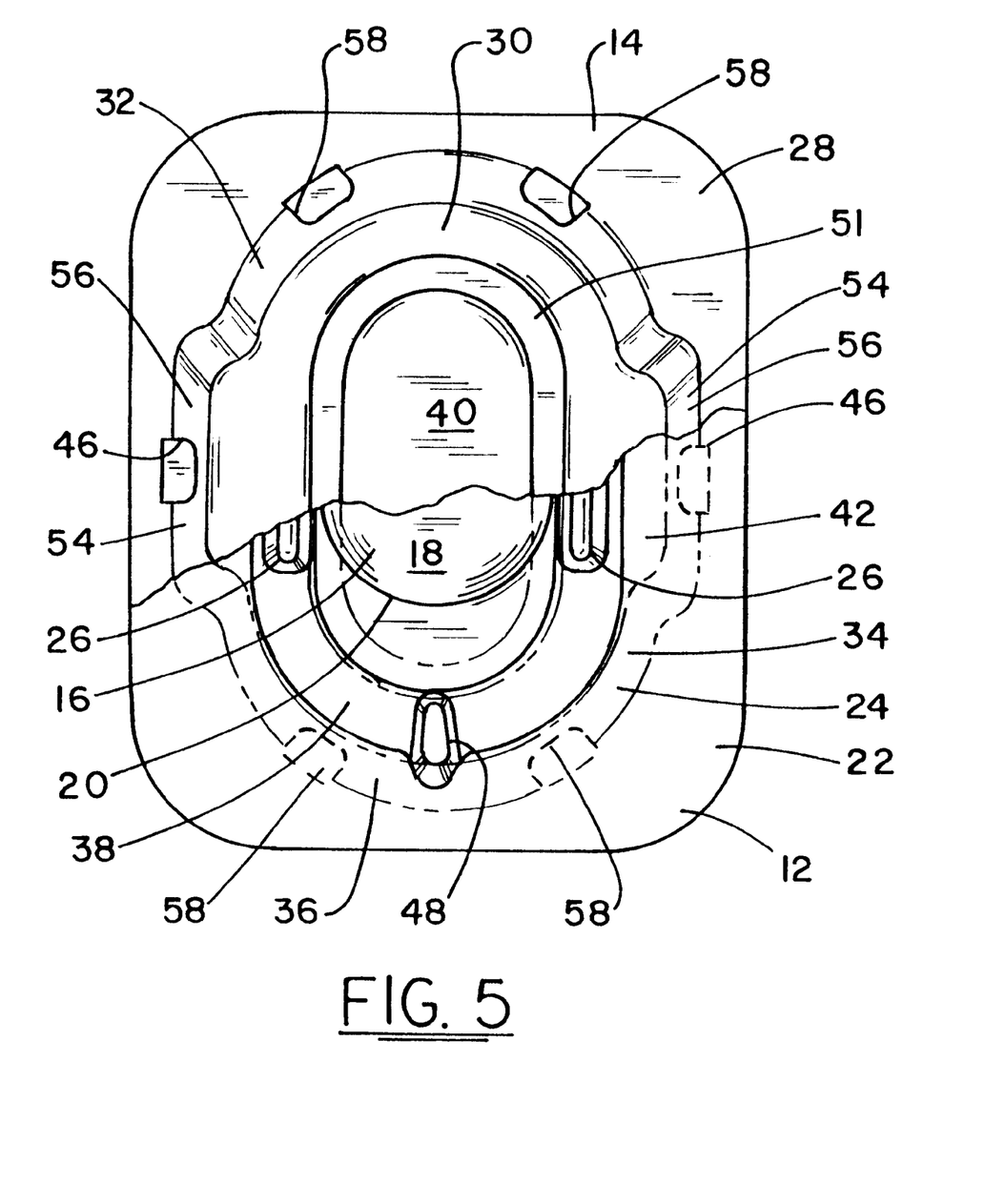
FIG. 5 is a top plan view of the insect bait station of FIG. 1, with a portion of the cover removed to reveal the underlying base, the removed portion of the cover being shown in phantom.

The shell wall 32 preferably is spaced from the bait cup wall 20, and thereby defines a walkway 34 therebetween that has a walkway floor 36 that includes the peripheral floor 24 of the base 12. The walkway 34 is best seen in FIG. 4 and FIG. 5. In FIG. 5, for example, the walkway 34 occupies the space between the portion of the shell wall 32 shown in phantom and the underlying bait cup wall 20.

The walkway 34 has a width sufficient to allow targeted insects to walk thereon. The walkway floor 36 may either be flat or may include other contours bridging from the level of the peripheral flange 22 of the base 12 toward the level of the uppermost extension of the bait cup wall 20. For example, in the embodiment shown at 10, a ramp 38 is included that extends from a portion of the peripheral floor 24 that is at the level of the peripheral flange 22 upwardly to the upwardmost extension of the bait cup wall 20. So long as the bait cup wall 20 remains climbable to the targeted insects, the exact configuration of the walkway floor may be varied. However, the ramp 38 is a preferred configuration in that it braces and thus imparts desirable rigidity to the bait cup wall 20.

The shell 30 further includes a roof 40. The roof 40 spans and encloses the space encompassed by the shell wall 32 and is unitarily continuous therewith. The roof 40 is supportable by the side support 26 and, because of the longitudinal extension of the side support, receives support for an extended distance rather than at just an isolated point. The roof 40 is sufficiently spaced above the upwardmost extension of the bait cup wall 20 that targeted insects may crawl over the bait cup wall to reach any bait contained within the bait cup 16.

An antechamber 42 is provided that preferably is at least as long as the side support 26 when the side support is in its preferred orientation. The antechamber 42 is best seen in FIG. 4 and FIG. 5. With the side support 26 so oriented, the antechamber 42 is defined on one side by the side support 26 and is defined on another side by interior surfaces of the shell wall 32. A part of the peripheral floor 24 enclosed within the antechamber 42 forms an antechamber floor 44 that is continuous with the walkway floor 36.

The antechamber 42 alternatively may be described as follows. A part of the shell wall 32 that preferably is at least as wide as and in any event is at the location of the side support 26 constitutes an antechamber shell wall 54. The bait cup wall 20 at the location of the side support 26 and the antechamber shell wall 54 define the antechamber 42 between them. Preferably portions of the antechamber shell wall 54 are displaced distally relative to the portions of the shell wall 32 immediately on either side of the antechamber 42 so that the antechamber shell wall 54 includes a thrust-out wall section 56. Besides providing a structure that accommodates the required space to contain the side support 26 and, depending on the orientation of the side support, for insects to maneuver within the antechamber 42 between the antechamber shell wall 54 and the side support 26, this design also has the advantage of introducing lateral undulations in the shell wall 32 that increase its ability to resist compressive forces applied from above.

Preferably, an antechamber door 46 is provided in the portion of the shell wall 32 that constitutes the antechamber shell wall 54, the antechamber door 46 opening into the antechamber 42. The antechamber door 46 has a size sufficiently large to admit a targeted insect. When the side support 26 is in its preferred orientation, the antechamber door 46 is so located in relation to the side support 26 that straight-line access through the antechamber door to the bait cup 16 is blocked or at least restricted by the side support. With the side support 26 so oriented, the antechamber 42 provides sufficient space from the side support 26 to the antechamber shell wall 54 that a targeted insect may enter the bait station 10 through the antechamber door 46, avoid the side support by entering the walkway 34, and thus gain access to any bait contained in the bait cup 16 by climbing the bait cup wall 20.

Preferably there are two side supports 26, as shown in the embodiment of the drawings, the two side supports being located on opposing sides of the bait cup 16. The exact position and number of the side supports 26 with respect to the bait cup wall 20 can be varied to produce alternative embodiments of the bait station 10 that fall within the scope and breadth of the invention.

Thus, in the embodiment shown in FIGS. 1–5, two side supports 26 are located immediately beside the bait cup 16, extending upwardly from the bait cup wall 20, so that the surfaces of the side supports 26 that are presented toward the bait cup 16 are substantially continuous with inwardly presented surfaces of the bait cup wall. However, a side support 26 may be at a location either within, at the side of, or exterior to and separated from the bait cup 16, at the discretion of the designer.

The location of the side supports 26 shown in FIGS. 1–6 is preferred as convenient to the manufacture of the base 12 in that it presents a less intricate shape for extraction from a mold. The arrangement shown also allows the bait cup wall 20 to provide a continuous, generally vertical support beneath one side of the side support 26, providing desirable resistance to crushing from a force applied to the side support from above. The arrangement also is preferred over a location of the side support 26 further removed from the center of the insect bait station 10 because the location shown reduces the distance between an opposed pair of side supports 26 that the roof 40 must span without support from beneath.

Further support for the roof 40 is preferred and may be provided by an end support 48. Preferably, the end support 48 extends upwardly from the base 12 at a location remote from the side support 26, the roof 40 being supportable by the end support. Preferably, as in the embodiment shown in FIGS. 2–5, the bait station 10 has two side supports 26 located on different and preferably opposed sides of the bait cup 16, with two antechambers 42, one associated with each side support, each antechamber having an antechamber door 46. Also preferably, at least one end support 48 is located at a position remote from the side supports 26.

The preferred arrangement is that shown in the drawings, wherein two end supports 48 are included, the end supports being located in opposed relation, spaced between two side supports 26, with the roof 40 being supportable by the end supports and the side supports. As with the side supports 26, the end supports 48 may be placed at any desirable location with respect to the bait cup wall 20, whether located immediately adjacent to the margin of the bait cup 16, as is shown in the drawings, or located within or at a position removed outwardly from the margin of the bait cup. The advantages of the position shown for the end supports 48 corresponds to that discussed with respect to the position shown for the side supports 26.

As a further aid in achieving a dimensionally stable insect bait station 10, the roof 40 preferably includes a locator rib 50, preferably downwardly extending, located immediately adjacent to the side support 26 to restrict lateral movement of the roof with respect to the side support. The relationship of the locator rib 50 to the embodiment of the side support 26 that is shown in FIGS. 1–5 is easily appreciated from FIG. 4.

If the bait station 10 includes two or more side supports 26 or one or more end supports 48, as is preferred, it is also preferred that the locator rib 50 be so designed as to pass immediately adjacent to and be available to engage surfaces of each side support and each end support, again to restrict lateral movement of the roof 40 with respect to those structures.

In the embodiment shown in the drawings, the locator rib 50 is a single, continuous, downwardly extending channel 51 formed in the roof 40, as may be seen in FIGS. 1, 2, 5, and 8. The embodiment of the locator rib 50 shown is thus a single, continuous structure located beside surfaces of the side supports 26 and end supports 48 that face inwardly, toward the middle of the bait station 10. However, to fall within the scope of the spirit of the invention, it is only required that the locator rib 50 be located immediately adjacent to surfaces of one or more side supports 26 or end supports 48. Thus, the locator rib 50 may be the continuous channel 51 shown in the drawings or, alternatively, may be one or more projections extending preferably downwardly from the roof 40 at the locations specified. A locator rib 50 falling within the scope and breadth of the invention could also include the structure that would be achieved if, instead of the channel 51 shown in the drawings, the locator rib was simply a central depressed area in the roof between the side supports and end supports. A locator rib said to be located "beside," "immediately beside," "adjacent to," or "immediately adjacent to" another structure such as a side or end support or a surface or part thereof shall be understood to be either in contact with that structure, surface, or part or be sufficiently close that it can come in contact when the shell is flexed by force applied by hand by a typical adult user of the insect trap.

As has been stated, it is preferred that the locator rib 50 extend downwardly from the roof 40. However, the locator rib 50 alternatively may extend upwardly, presenting a downwardly open groove (not shown) toward the interior of the bait station 10. So long as parts of the side supports 26 or end supports 48 extend upwardly to engage the interior of the groove, such an alternative arrangement falls within the breadth and scope of the invention. The term "locator rib" shall be understood to encompass both alternatives.

Again, with reference to FIG. 5, it will be apparent that, when the bait station includes opposed side supports 26, with or without the addition of opposed end supports 48, it is advantageous that the locator ribs 50 associated with opposed pairs of side or end supports be located adjacent to surfaces of the side and end supports that face toward the bait cup 16. Such an arrangement effectively restricts lateral movement of the roof 40 in any direction with respect to the base 12. Furthermore, this arrangement provides an automatic centering effect, directly locating the cover 14 (and specifically the shell 30) over the base 12 (and specifically the side and end supports 26,48) during assembly. Alternatively, to achieve the same effect, the locator ribs 50 associated with opposed side and end supports 26, 48 may be positioned adjacent to surfaces of the side and end supports that are presented outwardly, away from the bait cup 16, with a combination of these two alternative arrangements also being effective.

Figure 6:
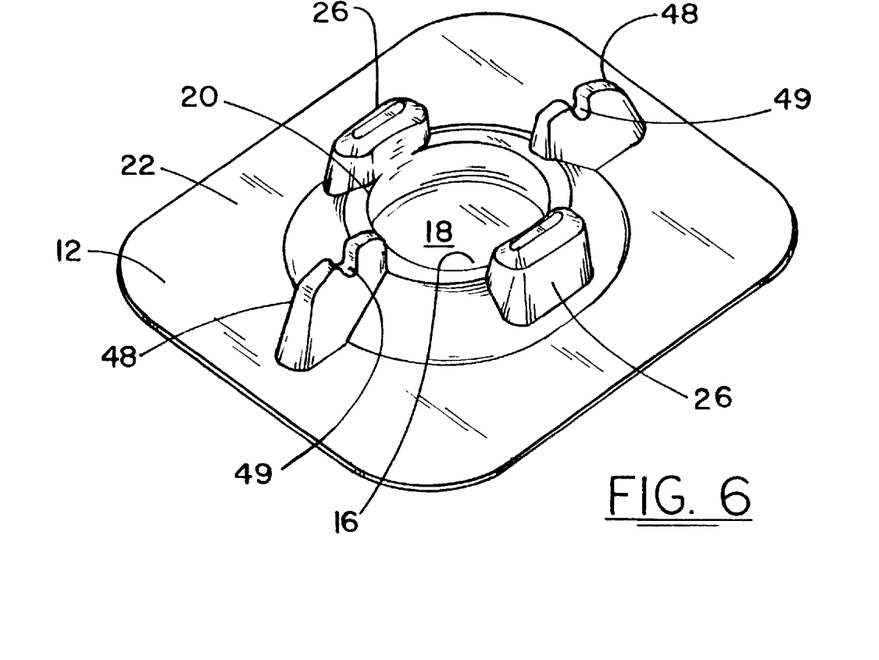
FIG. 6 is a front perspective view of an alternative embodiment of the base, corresponding to the base shown as a part of FIG. 2.
Figure 7:
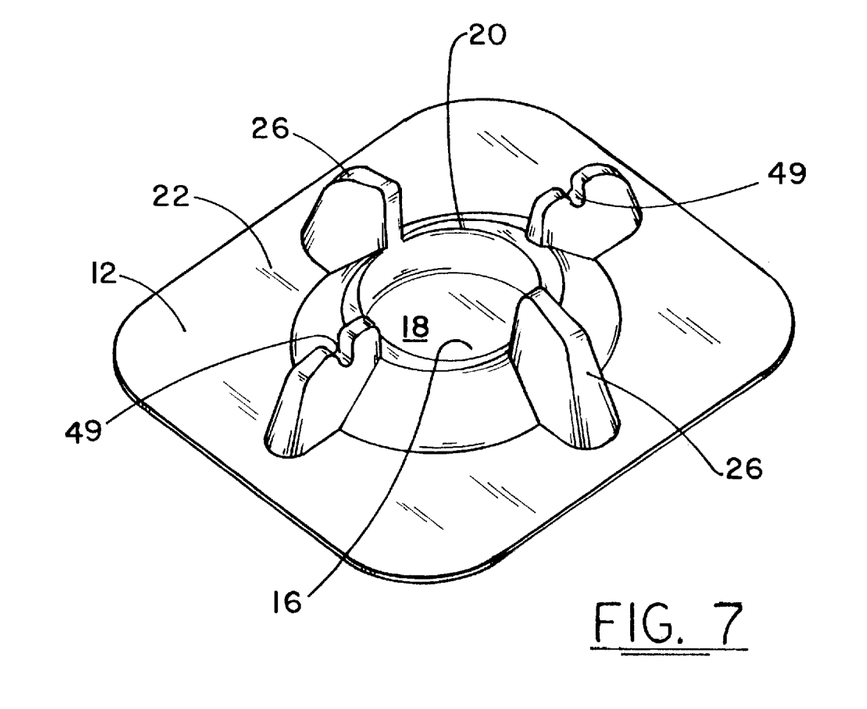
FIG. 7 is a front perspective view, comparable to FIG. 6, of a second alternative embodiment of the base.
Figure 8:
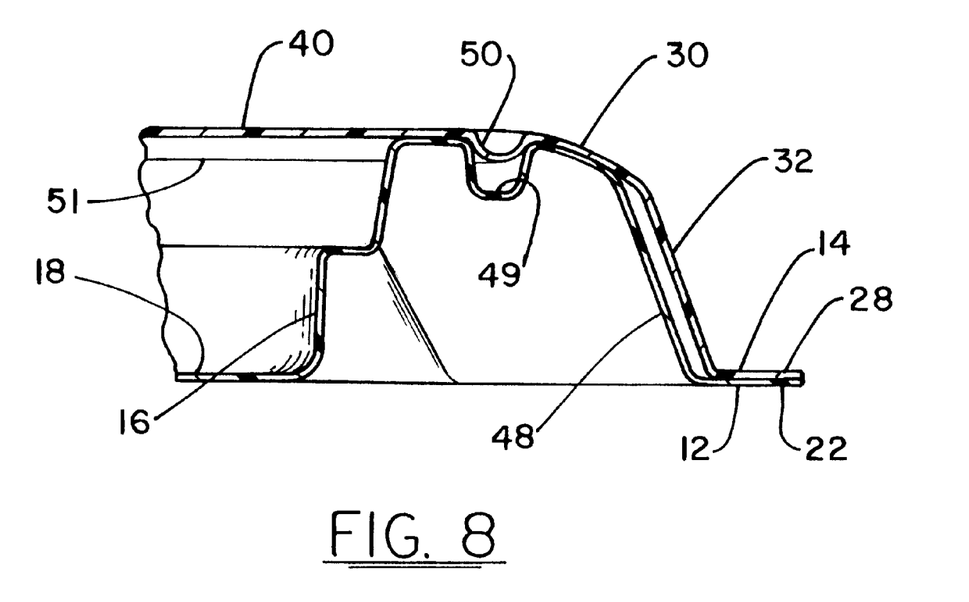
FIG. 8 is a cross-sectional view of a portion of an embodiment of the insect bait station of the invention utilizing the base of FIG. 6, the view otherwise corresponding to the right-hand portion of FIG. 3.

A second embodiment of the end support 48 that is especially preferred for its strength is shown in FIGS. 6–8. Features of the embodiment of the invention shown in FIGS. 6–8 that directly correspond to those of the embodiment of FIGS. 1–5 will be given like references numbers and will not be separately described. The embodiment of the end support 48 shown in FIGS. 6–8 includes a roof detent 49 adapted to receive the locator rib 50 in mating relation, as is best shown in FIG. 8. The embodiment of the locator rib 50 shown in the figures extends downwardly, as is preferred, and the roof detent 49 is an upwardly open notch adapted to receive the locator rib. If the locator rib 50 extends upwardly, presenting a downwardly open groove, as in the alternative arrangement described above, the roof detent 49 may be an upwardly projecting structure adapted to engage the downwardly open groove. This arrangement firmly anchors the roof 40 and restricts its lateral motion with respect to the end support 26. If the locator rib 50 is itself laterally extended, as is the channel 51 shown in the drawings, the locator rib 50 then functions as a stabilized beam, further stiffening the roof 40.

The embodiment of the insect bait station shown in FIG. 6 is the embodiment presently preferred for most applications of the invention. However, FIG. 7 shows an alternative embodiment of the side support 26 that presents advantages especially for larger insect bait stations. This embodiment employs an alternative orientation of the side support 26, in which the side support extends not longitudinally generally along the bait cup wall 20 but, instead, extends outwardly from the vicinity of the bait cup wall toward the shell wall 32, preferably within an antechamber 42. With the side support 26 so oriented, the side support may be allowed to contact inwardly facing surfaces of the shell wall 32, outwardly facing surfaces of the locator rib 50, or (preferably) both, with the effect of both supporting the roof 40 and restricting the lateral movement of the shell 30 with respect to the side support. If an antechamber door 46 is included, it must then be located to one side of the side support 26.

As has been stated, above, the bait cup 16 may be round, oval, square, or any other convenient geometric figure having curved or straight sides, or a mixture of curved and straight sides. Similarly, the shell 30 may assume any of the variations in shape just referred to. The bait cup 16 and shell 30 may have generally concentric and corresponding shapes or they may have different shapes. By way of example only, a generally oval or oblong shell may be used alternatively with a round bait cup or with an oval or oblong bait cup wherein the ratio of length to width of the bait cup differs from the corresponding ratio of length to width of the shell.

In the preferred embodiment described thus far and shown in the drawings, the side supports 26 and end supports 48 are unitarily formed features of the base 12. However, understood more generally, these structures may alternatively be formed as unitary features of the cover 14, extending downwardly therefrom toward the base 12. Thus, the side supports 26 and end supports 48 may be more generally described as features either of the cover 14 or base 12 that span the space between the cover and the base, the roof 40 being supportable thereby, with the side support preferably extending longitudinally generally along the bait cup wall 20, as the term "generally along" has been defined previously. When extending downwardly from the cover 14, these features may be formed so as to rest immediately adjacent to such upwardly extending structures of the base 12 as the bait cup wall 20 or the ramp 38 to restrict lateral motion of the cover with respect to the base, these base structures now also functioning in a manner corresponding to that of the locator ribs 50 in the embodiment shown on the drawings and described above.

The bait station 10 may include other features not interfering or inconsistent with those already described. For example, additional doors 58 communicating with the walkway 34 and large enough to admit targeted insects may be included at convenient locations in the shell wall 32 that are not obstructed by a side support 26 or an end support 48. Antechambers need not be provided for such doors 58 in that insects entering the bait station 10 may directly proceed to climb the bait cup wall 20, with no need to move laterally to avoid an obstructing structure. Similarly, it is not strictly required that each antechamber 42 be provided with an antechamber door 46, if sufficient doors 58 are located elsewhere in the shell wall 32.

The invention further includes a method of presenting bait to crawling insects that includes the steps of providing a bait station made in accord with the description provided above wherein a selected bait has been deposited in the bait cup, followed by the step of placing the bait station on a surface where it will be exposed to the targeted insects.

While preferred forms of the invention have been shown in the drawings and have been described above, variations will be apparent to those skilled in the art. Consequently, the invention should not be construed as limited to the specific forms and steps shown and described. Instead, the invention should be understood in terms of the following claims.

INDUSTRIAL APPLICABILITY

The practical means of manufacture and use of the invention has been described, above. The use of effective and practical bait stations to present insecticide and other baits to crawling insects is of well established commercial application, world-wide.

What is claimed is:

1. A bait station for targeted crawling insects, comprising a base and a cover that is fastened to the base,
   the base including
      a. a bait cup for containing a selected bait, the bait cup having a central floor surrounded by an insect-climbable bait cup wall extending upwardly from the central floor,
      b. a peripheral flange including a peripheral floor distal and adjacent to the bait cup, and
      c. an end support extending upwardly from the peripheral floor, the end support having a roof detent; and
   the cover having a cover flange attached to the peripheral flange of the base and further including a shell that includes
      a. a shell wall rising from the level of and enclosing the peripheral floor of the base,
      b. a roof spanning the space encompassed by the shell wall, the roof being supportable by the end support and being sufficiently spaced above the bait cup wall that targeted insects may crawl over the bait cup wall to reach any bait contained within the bait cup, the roof further including a locator rib engaged with the roof detent of the end support to stabilize movement of the roof with respect to the end support.

2. The bait station of claim 1 wherein the roof detent is upwardly open and the locator rib extends downwardly from the roof.

3. The bait station of claim 1 wherein the locator rib is a channel that extends beyond the roof detent to either side of the end support to form a stabilized beam within the roof.

4. The bait station of claim 1 wherein
   a. one of the cover and the base includes a side support substantially spanning the space between the cover and the base at a location remote from the end support, the roof being supportable by the side support; and
   b. a part of the shell wall generally at the location of the side support constitutes an antechamber shell wall, the bait cup wall at the location of the side support and the antechamber shell wall defining an antechamber between them, with the antechamber shell wall being displaced distally relative to the portions of the shell wall immediately on either side of the antechamber to define a thrust-out wall section.

5. The bait station of claim 4 wherein
   a. the side support extends longitudinally generally along the bait cup wall,
   b. the shell wall is spaced from the bait cup wall to define a walkway therebetween having a walkway floor of a width sufficient to allow targeted insects to walk thereon, and
   c. the antechamber is open to the walkway with an antechamber floor that is continuous with the walkway floor, the antechamber having an antechamber door, opening through the shell wall into the antechamber, the antechamber door having a size sufficiently large to admit a targeted insect and being so located in relation to the side support that straight-line access through the antechamber door to the bait cup is restricted by the side support, the antechamber being of a size such that it provides space between the side support and the antechamber shell wall sufficient that a targeted insect may enter the bait station through the antechamber door, avoid the side support by entering the walkway, and thus gain access to any bait contained in the bait cup.

6. A bait station for targeted crawling insects, comprising a base and a cover that is fastened to the base,
   the base including
      a. a bait cup for containing a selected bait, the bait cup having a central floor surrounded by an insect-climbable bait cup wall extending upwardly from the central floor,
      b. a peripheral flange including a peripheral floor distal and adjacent to the bait cup, and
      c. a side support extending upwardly above the level of the bait cup wall;
   the cover having a cover flange attached to the peripheral flange of the base and further including a shell that includes
      a. a shell wall rising from the level of and enclosing the peripheral floor of the base,
      b. a roof spanning the space encompassed by the shell wall, the roof being supportable by the side support and being sufficiently spaced above the bait cup wall that targeted insects may crawl over the bait cup wall to reach any bait contained within the bait cup,
      c. an antechamber defined on one side by the side support and on another side by interior surfaces of the shell wall, and
      d. an antechamber door in the shell wall, opening into the antechamber and having a size sufficiently large to admit a targeted insect, the antechamber door being so located in relation to the side support that straight-line access through the antechamber door to the bait cup is restricted by the side support,
   the antechamber providing sufficient space from the side support to the shell wall that a targeted insect may enter the bait station through the antechamber door, avoid the side support, and thus gain access to any bait contained in the bait cup.

7. The insect bait station of claim 6 wherein the shell wall is spaced from the bait cup wall to define a walkway therebetween having a walkway floor of a width sufficient to allow targeted insects to walk thereon, the side support extends longitudinally generally along the bait cup wall, and the antechamber has a floor that is continuous with the walkway floor.

8. The bait station of claim 6 wherein the roof of the shell includes a locator rib that is located immediately beside the side support to restrict lateral movement of the roof with respect to the side support.

9. The bait station of claim 6 having an end support extending upwardly from the base at a location remote from the side support, the roof being supportable by the end support.

10. The bait station of claim 9 wherein the end support has a roof detent, the bait station further including a locator rib extending from the roof and engaged with the roof detent to stabilize movement of the roof with respect to the end support.

11. The bait station of claim 10 wherein the roof detent is upwardly open and the locator rib extends downwardly from the roof.

12. The bait station of claim 10 wherein the locator rib is a channel that extends beyond the roof detent to either side of the end support to form a stabilized beam within the roof.

13. The bait station of claim 9 having two end supports and two side supports, and wherein a locator rib extending downwardly from the roof is located immediately adjacent to each side support and each end support to restrict lateral movement of the roof with respect to the side and end supports.

14. A bait station for targeted crawling insects, comprising a base and a cover that is fastened to the base,
   a. the base including
      i. a bait cup for containing a selected bait, the bait cup having a central floor surrounded by an insect-climbable bait cup wall extending upwardly from the central floor, and
      ii. a peripheral flange including a peripheral floor distal and adjacent to the bait cup;
   b. the cover having a cover flange attached to the peripheral flange of the base and further including a shell that includes
      i. a shell wall rising from the level of the peripheral floor of the base, and
      ii. a roof spanning the space encompassed by the shell wall, at a distance above the bait cup wall sufficient that targeted insects may crawl over the bait cup wall to gain access to any bait contained therein;
   c. one of the cover and the base including a side support substantially spanning the space between the cover and the base, the roof being supportable by the side support; and
   d. a part of the shell wall at the location of the side support constituting an antechamber shell wall, a part of the antechamber shell wall being displaced distally relative to the parts of the shell wall immediately on either side of the antechamber shell wall so that the antechamber shell wall defines a thrust-out wall section, the space between the antechamber shell wall and the portion of the bait cup wall opposed thereto defining an antechamber.

15. The bait station of claim 14 having an end support at a location remote from the side support, the end support extending from one of the base and the cover to substantially span the space therebetween, the roof being supportable by the end support.

16. The bait station of claim 15 wherein the end support extends from the base and a locator rib extends from the roof immediately beside surfaces of the side support and the end support to restrict lateral movement of the roof with respect to the side and end supports.

17. The bait station of claim 16 wherein the bait cup has opposed sides and opposed ends, with opposed side supports extending from the base being located at the sides and opposed end supports being located at the ends; and wherein a locator rib is associated with each of the opposed side supports and the opposed end supports, each locator rib being located beside surfaces of the opposed side and end supports that face toward the bait cup.

18. A method of presenting bait to targeted crawling insects comprising the steps of:
   a. providing a bait station in accordance with claim 1, further including a selected bait placed within the bait cup;
   b. placing the bait station on a surface upon which the targeted insects crawl.

19. A method of presenting bait to targeted crawling insects comprising the steps of:
   a. providing a bait station in accordance with claim 6, further including a selected bait placed within the bait cup;
   b. placing the bait station on a surface upon which the targeted insects crawl.

20. A method of presenting bait to targeted crawling insects comprising the steps of:
   a. providing a bait station in accordance with claim 14, further including a selected bait placed within the bait cup;
   b. placing the bait station on a surface upon which the targeted insects crawl.

* * * * *